US012247400B2

(12) United States Patent
Douglass

(10) Patent No.: US 12,247,400 B2
(45) Date of Patent: Mar. 11, 2025

(54) DEVICES AND METHODS FOR FITTING LUXURY VINYL FLOORCOVERING TO INTERIOR STAIRS

(71) Applicant: LVP Stairs LLC, Columbus, GA (US)

(72) Inventor: Michael S. Douglass, Columbus, GA (US)

(73) Assignee: LVP Stairs LLC, Columbus, GA (US)

( * ) Notice: Subject to any disclaimer, the term of this patent is extended or adjusted under 35 U.S.C. 154(b) by 0 days.

(21) Appl. No.: 18/123,385

(22) Filed: Mar. 20, 2023

(65) Prior Publication Data

US 2023/0228096 A1 Jul. 20, 2023

Related U.S. Application Data

(63) Continuation of application No. 17/175,592, filed on Feb. 12, 2021, now Pat. No. 11,608,642.

(60) Provisional application No. 62/975,987, filed on Feb. 13, 2020.

(51) Int. Cl.
*E04F 11/17* (2006.01)
*B26D 3/08* (2006.01)
*E04F 15/10* (2006.01)
*E04F 15/02* (2006.01)

(52) U.S. Cl.
CPC .............. *E04F 11/17* (2013.01); *B26D 3/085* (2013.01); *E04F 15/10* (2013.01); *E04F 15/0215* (2013.01); *E04F 2203/08* (2013.01)

(58) Field of Classification Search
CPC ....... E04F 11/17; E04F 2203/08; E04F 15/10; E04F 15/0215; B26D 3/085
USPC .......... 52/179, 182, 183, 741.2, 85, 86, 245; 83/485, 486, 549, 614, 863, 864, 879, 83/883, 884
See application file for complete search history.

(56) References Cited

U.S. PATENT DOCUMENTS

| | | | | | |
|---|---|---|---|---|---|
| 228,686 | A * | 6/1880 | Smith | B26D 7/025 | 83/614 |
| 334,994 | A * | 1/1886 | Spadone | E04F 11/17 | 16/10 |
| 372,941 | A * | 11/1887 | Sperry | E04F 11/17 | 52/179 |
| 446,213 | A * | 2/1891 | Sperry | E04F 11/17 | 217/53 |
| 535,803 | A * | 3/1895 | Marcus | E04F 11/17 | 52/179 |
| 989,409 | A * | 4/1911 | Perrott | E04F 11/17 | 52/179 |
| 1,344,310 | A * | 6/1920 | Parker | E04F 11/17 | 52/179 |

(Continued)

*Primary Examiner* — Brian E Glessner
*Assistant Examiner* — Adam G Barlow
(74) *Attorney, Agent, or Firm* — Clayton, McKay & Bailey, PC

(57) ABSTRACT

Systems and methods can include scoring a backing material of a luxury vinyl plank ("LVP") to allow an otherwise rigid plank to flex within a scoring section. The scoring section can include multiple parallel grooves that reach a depth that partially scores the backing material. The LVP can be positioned on a stair tread such that the scoring section wraps around an edge of the tread nose. The LVP can be clamped on top and bottom of the stair tread nose to allow adhesives to take effect. A scoring device can include a blade assembly with multiple blades to create multiple scored grooves in one pass.

19 Claims, 7 Drawing Sheets

(56) References Cited

U.S. PATENT DOCUMENTS 1,622,739 A * 3/1927 Rosenblum ............. E04F 11/17 52/179
1,671,084 A * 5/1928 Meyercord ............. B28B 11/04 52/631
1,732,933 A * 10/1929 Frazier .................... E04F 11/17 280/169
1,894,592 A * 1/1933 Kilmer .................. E04B 1/7654 181/290
1,998,357 A * 4/1935 Carison .................... B26D 9/00 83/505
2,236,465 A * 3/1941 Carlson ................. E04F 11/163 16/10
2,436,139 A * 2/1948 Clark .................... E04F 11/163 52/179
2,989,094 A * 6/1961 Panavas .................. B27B 5/201 83/485
3,160,987 A * 12/1964 Pinkley ................. E04D 13/152 52/95
3,557,840 A * 1/1971 Maybee ................ F16L 59/161 52/794.1
3,969,868 A * 7/1976 Bainter .................. B62D 29/04 428/167
3,983,771 A * 10/1976 Bonaddio .............. B26D 3/085 83/425.3
4,060,947 A * 12/1977 Naka ..................... E04F 11/166 52/179
4,098,155 A * 7/1978 Insolio .................... C03B 33/10 83/590
4,259,778 A * 4/1981 Greenwood ......... H01R 43/042 29/566.4
4,704,837 A * 11/1987 Menchetti ............... E04C 2/043 52/273
4,987,812 A * 1/1991 Benavidez ............. B26D 1/045 83/522.11
5,189,939 A * 3/1993 Allen, Jr. ................ A23L 3/363 83/885
5,531,048 A * 7/1996 Darling .................... B27D 1/00 52/182
5,601,007 A * 2/1997 Clough .................. B26D 3/085 83/578
5,697,282 A * 12/1997 Schakel .................. B29C 53/06 83/563
6,088,976 A * 7/2000 Roy ................... A47G 27/0287 52/180
6,178,864 B1 * 1/2001 Benuzzi ................. B27G 19/10 83/485
7,200,940 B2 * 4/2007 MacKelvie .............. B21J 5/068 30/502
8,640,404 B2 * 2/2014 McCool .................. E04F 11/16 52/179
9,074,365 B2 * 7/2015 Wright ................. H02G 3/0608
11,326,351 B2 * 5/2022 Raine .................... E04F 11/166
2002/0185121 A1 * 12/2002 Farnworth ............. B28D 5/029 83/474
2004/0074177 A1 * 4/2004 Berman .............. E04F 19/0477 52/287.1
2005/0166745 A1 * 8/2005 Tokumitsu ............. B28D 5/029 83/72
2006/0032356 A1 * 2/2006 Newman ................. B27B 5/075 83/489
2006/0230693 A1 * 10/2006 Giordano ................ E04G 21/30 52/182
2007/0151180 A1 * 7/2007 Pace ....................... E04F 19/04 52/287.1
2009/0145059 A1 * 6/2009 Kay ...................... E04F 11/166 52/287.1
2009/0277104 A1 * 11/2009 McCool ................ E04F 11/108 52/182
2011/0132236 A1 * 6/2011 French ................... B65D 65/44 493/379
2011/0162302 A1 * 7/2011 Barrett .................... E04F 11/17 52/182
2012/0167498 A1 * 7/2012 Wright .................... E04F 17/04 52/287.1
2012/0279373 A1 * 11/2012 Heo ..................... G02B 6/0065 83/884
2013/0305635 A1 * 11/2013 McCool ................ E04F 11/108 52/741.2
2016/0010338 A1 * 1/2016 Steijvers ............... E04F 11/175 52/741.1
2020/0131779 A1 * 4/2020 Nedza ..................... B32B 27/12
2020/0299970 A1 * 9/2020 Raine ...................... E04F 11/17
2020/0346482 A1 * 11/2020 Mendez .................. E04F 11/17
2021/0381244 A1 * 12/2021 Iannacone, III ...... E04F 11/163
2022/0170270 A1 * 6/2022 Van Vechten ......... E04F 11/163
2022/0213690 A1 * 7/2022 Iannacone, III ...... E04F 11/163

* cited by examiner

DEVICES AND METHODS FOR FITTING LUXURY VINYL FLOORCOVERING TO INTERIOR STAIRS

CROSS-REFERENCE TO RELATED APPLICATION

This application claims the benefit of and priority to U.S. patent application Ser. No. 17/175,592, filed Feb. 12, 2021, which claims priority to U.S. Provisional Application No. 62/975,987, filed on Feb. 13, 2020, titled "Devices and Methods for Fitting Luxury Vinyl Plank Floorcovering to Interior Stairs," the contents of which are hereby incorporated herein by reference in their entireties.

BACKGROUND

Luxury vinyl plank ("LVP") material has gained widespread popularity as a floorcovering material in both new dwellings and in renovation projects. LVP can have the look of wood flooring, stone, or any number of different real or imagined materials. LVP is typically rigid, with a backing material such as rubber, providing rigidity. It is typically applied and secured to a concrete or wood floor substrate using glue specific for that purpose. Compared to traditional, relatively inexpensive floorcovering products, such as carpet, LVP has proven very durable and long lasting. LVP is typically produced in planks that are shipped in boxes. Each plank is typically a straight "board."

However, despite LVP's advantages, it is also much harder to match against stairs. Traditional wood floors simply require one to purchase and install the same type of wood stair treads. The treads can then be stained the same way as the floors. But LVP offerings typically do not include special stair treads that are matched to the planks. When it comes to stairs, one of LVP's greatest strengths—variety—becomes a weakness. The planks themselves are not meant to be seen at the edges and therefore cannot be applied to stairs in an attractive fashion without using multiple preformed pieces at the stair nosings.

Homeowners currently may bypass using LVP based on inability to match stairs to the floor if LVP is used. Instead, the homeowners may be forced to opt for real hardwoods to achieve a similar look. This can be disadvantageous from a monetary or floor maintenance perspective. Another option is to use short-lived carpeting to cover the highly trafficked stairs, which presents a challenge if LVP floorcovering is desired on upper floor levels of the home. Transitioning from carpeted stairs back to LVP floorcovering on an upper floor level can present multiple issues.

As a result, a need exists for methods and/or system to modify LVP for stair usages. There is also a need to apply suitably modified LVP floorcovering material to stairs, in order to allow a seamless transition to LVP floorcovering applied to the upper floor.

SUMMARY

Examples described herein include systems and methods for modifying LVP to fit properly onto interior stairs. The systems and methods can repurpose a section of LVP by scoring an underside backing material to create parallel scored grooves. The scored groves can together create a scored section that is flexible. The parallel scored grooves can partially penetrate the backing material and form a scored section. The grooves can be V-shaped in an example. In one example, the scored section can have a width that is selected based on a thickness of stair tread nosing that the LVP will wrap around. The parallel scored grooves are oriented parallel to a long side of the stair tread and nosing, in an example.

The scoring can be accomplished at a jobsite or at a manufacturing facility. The method may include scoring the rubber backing of the LVP using a router. The router can include multiple blades that can score the rubber backing of the LVP. LVP modified to cover the stair tread and stair nosing can be wider than an LVP floorcovering plank, which can be cut to a width of about 13 inches, in an example. The user can cut a larger sheet of LVP to fit the stair components if needed.

An installer can place the piece of LVP onto a stair tread, aligning the series of scored grooves with the leading edge of the stair tread. Then the scored section can be wrapped around the leading edge of the stair tread to clad the stair nosing. The scored grooves can provide flexibility for an otherwise rigid piece of LVP to bend. To secure the piece of LVP, the installer can fasten the piece to both the top and bottom of the stair tread and nosing. This can include applying adhesive to the exposed top and bottom of the stair tread, in an example. Additionally, staples or nails can be used. In one example, heat can be applied to the scoring section prior to conforming it around the stair tread nose, using a common hair dryer or similar device. Heating the LVP can allow the LVP to be more malleable without cracking or splitting.

In one example, after the staples are applied to the LVP that as wrapped around the underside of the tread, the method can include installing a piece of trim to hide the staples.

To secure the LVP for purposes of securing it to the stair tread, the installer can clamp the piece of LVP on the top and bottom of the stair tread. The clamp can include boards on both the top and bottom, ensuring even clamping down the width of the stair tread. Alternatively, multiple independent clamps can be spaced along the stair tread. The clamps can be placed on the LVP as the glue application is curing, in an example.

Before the LVP is applied to the stairs, glue specifically manufactured for the LVP can be applied to the riser, tread, and nosing bend. The method can also include stapling the LVP to the underside of the nosing position on each stair. After the LVP is applied to the stairs, staples can be inserted into the LVP as the glue application underneath the LVP is curing. The method can also include factory-applied glue for a peel-and-stick application of the scored LVP to the stair. The adhesive can be applied after the grooves are scored in an example, allowing a user to peel off a backing and apply the LVP to the stair.

In one example, the piece of LVP can be glued to the wood stair tread and both glued and stapled beneath the wood stair nosing. Then a decorative piece of trim can be applied over the staples. This can hide the staples and provide an additional hold on the edge of the LVP flooring material.

On-site measurements can allow for using a piece of LVP to cover any size of stair tread, nosing, and riser. For each stair, a distance between a stair riser and the stair nosing position can be measured. The stair riser can be the vertical section between each stair tread, while the stair nosing is the leading edge of the horizontal stair tread, protruding an inch or so horizontally past each stair riser. The method can include measuring the length of the tread nosing bend on each of the stairs. The tread nosing bend can include the area around the stair nosing for each stair. The method may also include determining width of each of the stairs from left stringer position to right stringer position. The LVP can also be cut to fit between the width of the left stringer position and the right stringer position. The LVP can be applied according to the distance between the bottom of the riser and the under-nosing termination positions on each stair. Further, the LVP can be applied according to the length of the tread nosing bend and the determined width between the left stringer position and the right stringer position. The method can include cutting the LVP into portions to enable the LVP to fit from the riser position, to the tread position and around the tread nosing bend. The method can also include cutting the LVP into portions to enable the LVP to fit the riser positions.

The examples summarized above can each be incorporated into a variety of staircases. The LVP floorcovering can be scored and cut to fit and wrap/conform around a variety of stairs.

Both the foregoing general description and the following detailed description are explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples herein describe systems and methods for placing a piece of LVP onto a stair tread in a manner that wraps around a nose of the tread. In one example, an installer or manufacturer can score a backing material of a piece of LVP. The scoring can include creating parallel scored grooves (e.g., V-shaped) that partially penetrate the backing material and form a scoring section. To create the parallel grooves, a user can repeatedly pass a router across the LVP in straight lines by using a guide, such as a rip fence or ruler. Alternatively, multiple parallel grooves can be scored at once using a multi-blade router that moves along a trolley.

The scored LVP can be bent around the nose of a stair tread to create the visual impression that the entire tread is made of the LVP. This can include clamping the piece of LVP on the top and bottom of the stair tread while glue cures and/or so that stapling can be performed. The scored LVP can also have factory-applied adhesive for a peel-and-stick application to the stairs. It can be applied at the factory over the scored section, in an example.

Other field-specific cuts can also be made. Various distances between positions on each of the stairs can be measured to enable the LVP to be scored and cut accordingly to conform to the measurements of each of the stairs. The distance between a stair riser and a stair tread can be measured. A distance between the stair riser and the stair nosing can also be measured. In addition, a width of each stair from one stringer position to another stringer position can also be measured. Once the various dimensions of the stairs have been determined, the LVP can be cut to conform to the measurement of the stairs. A utility knife can be used to cut a top side of the LVP. Glue can be applied to each of the stairs once the LVP has been prepared. Alternatively, factory-applied adhesive can be applied to the LVP material after the LVP has been prepared/scored. The LVP can be applied to the stairs. Further, clamps and staples can be applied to the LVP to hold the LVP in place beneath the tread nose. The clamps can later be removed.

Figure 1A:
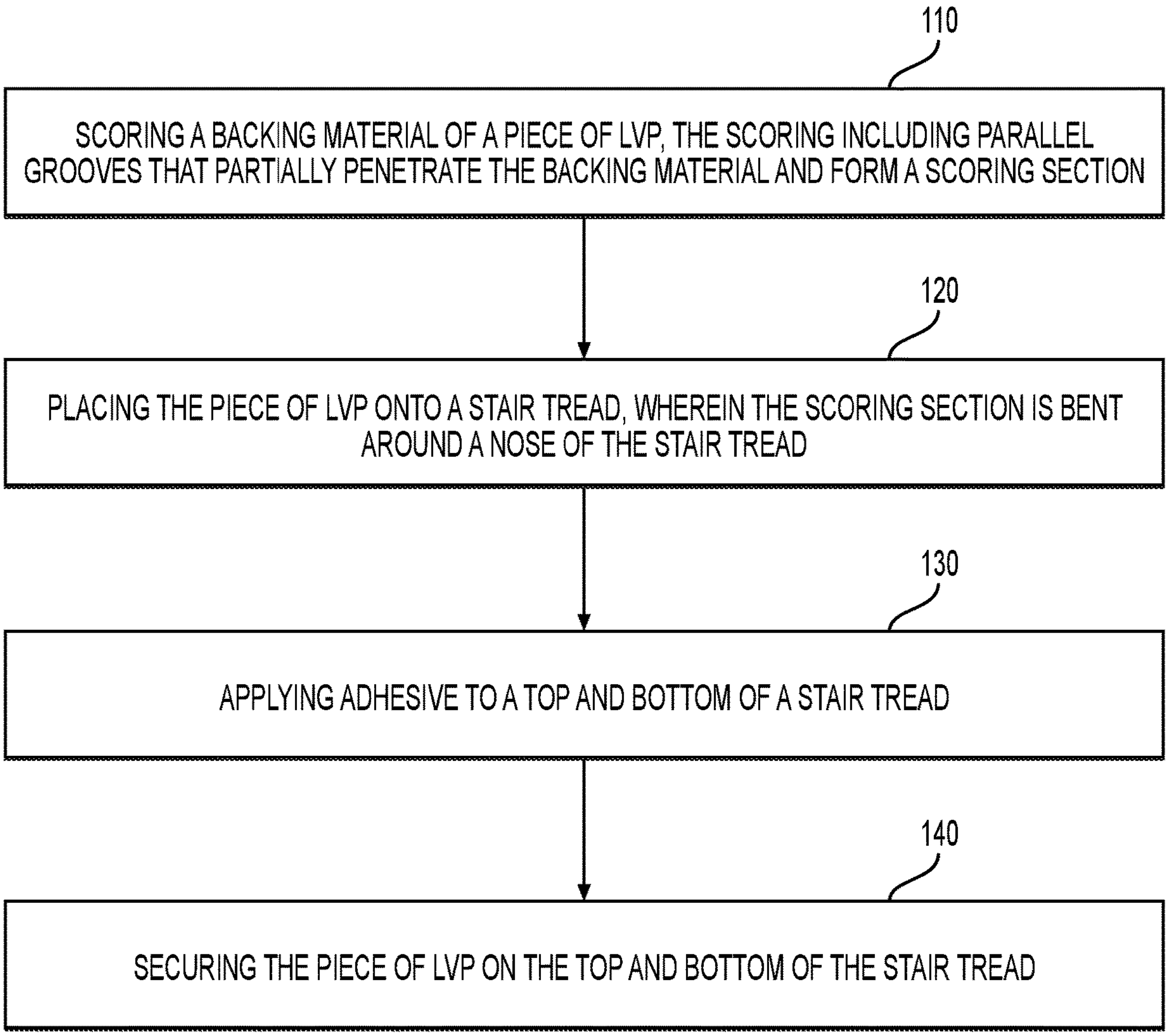
FIG. 1A is a flowchart of an example method for applying a piece of LVP onto a stair tread having a nose.

FIG. 1A illustrates an example flowchart for applying LVP to traditional staircases. At stage 110, the installer or a manufacturer of LVP can score a backing material that is part of a piece of LVP. The backing material can be rubber, plastic, or some other material meant to make contact with a substructure, such as wood or concrete. The scoring can be done using a blade. This can include using a router, in an example. The router can have one or more blades. The scoring can include parallel grooves that partially penetrate the backing material and form a scoring section. These parallel scoring lines can be oriented perpendicularly to a first side of the piece and perpendicularly to another side. To create the parallel grooves, the cutting instrument can use a guide and be slid horizontally across the LVP. The guide can either be moved in small increments, or a multi-blade router can be used to cut multiple grooves in a single pass.

At stage 120, the installer can place the piece of LVP onto a stair tread. The scoring section can be aligned with the nose edge of the stair tread, allowing the LVP to wrap around the edge of the nose of the stair. Prior to doing this, at stage 130, an installer can apply adhesive to the exposed parts of the stair tread, including the nose edge. Alternatively, factory-applied adhesive can be applied to the LVP material after the LVP has been prepared/scored.

At stage 140, the installer can clamp the piece of LVP on the top and bottom of the stair tread. This can secure the piece of LVP to the top and bottom of the stair tread until the adhesive cures.

In one example, securing the LVP to the bottom of the stair can also include applying a piece of trim below the stair nosing. This can sandwich the LVP against the bottom of the stair, in an example.

Figure 1B:
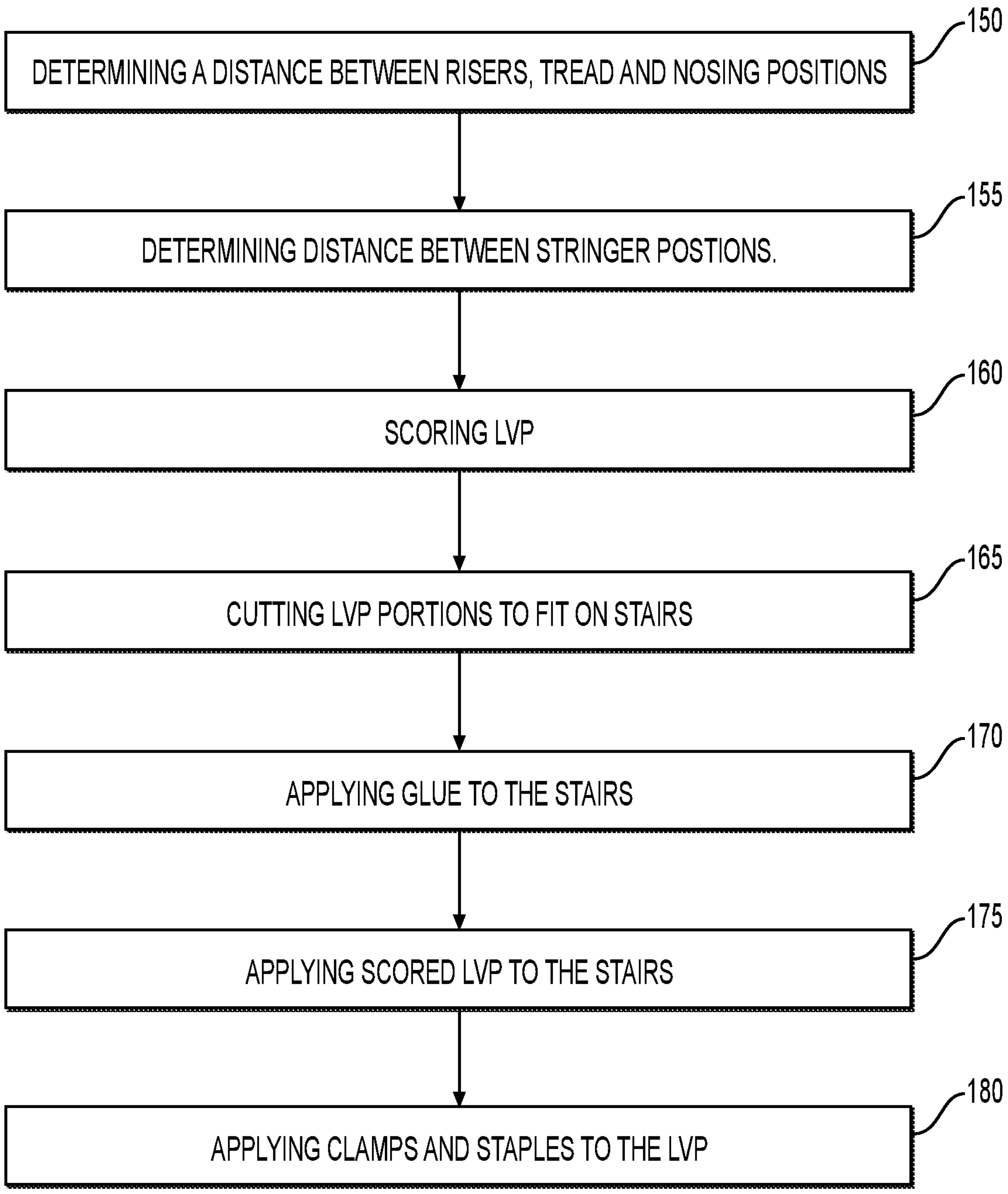
FIG. 1B is a flowchart of an example method for applying a piece of LVP onto a stair tread having a nose.

FIG. 1B illustrates an example method in which the LVP can be applied onto the stairs. At stage 150, the user can determine a distance from a first stair riser, across the stair tread, around the stair nose, to meet with the lower stair riser. The user can do so with a measuring tape or string, in an example. The length of the LVP can be determined according to the distance between these positions on each of the stairs. At stage 155, a width between a left stringer position and a right stringer position, representative for each of the stairs in a staircase, can be measured. The horizontal distance between the left stringer position and the right stringer position can inform the cutter of the width of the LVP that can be used on each stair.

At stage 160, a router can score the rubber backing of the LVP in grooves to prepare the LVP to be applied onto the stairs. The router can include multiple blades to score the rubber backing. The router can score multiple V-shaped grooves within the rubber backing, in an example. The multiple V-shaped grooves can be scored up to 1⁄24 to 1⁄32 inches deep. Alternatively, the scoring depth can be about halfway through the backing. The V-shaped grooves that are scored within the rubber backing can be approximately 1⁄16 inches apart from each other, in an example. The V-shaped grooves scored within the LVP can enable the LVP to more easily conform to the contoured section of the stairs.

At stage 165, a utility knife or straightedge can be used to cut the top side of the LVP to fit the components of the stairs. At stage 50, several portions of the LVP can be cut to fit the components of the stairs.

At stage 170, glue can be applied to each of the stairs to enable the LVP to be secured onto the stairs. At stage 175, the LVP can be applied to the stairs as the glue application cures. At stage 180, permanent staples and temporary clamps can be applied to the LVP at the underside of the stair tread nose as the glue application cures underneath the LVP. The clamps can be removed after the glue application has cured underneath the LVP.

Additionally, in one example a piece of trim can be installed beneath the stair nose. This can serve two functions. First, it can provide additional support to the LVP to prevent it from peeling back beneath the stair tread. Second, it can hide any staples or glue that may be present on the underside of the stair, such as where the LVP curls back towards the riser.

Figure 2A:
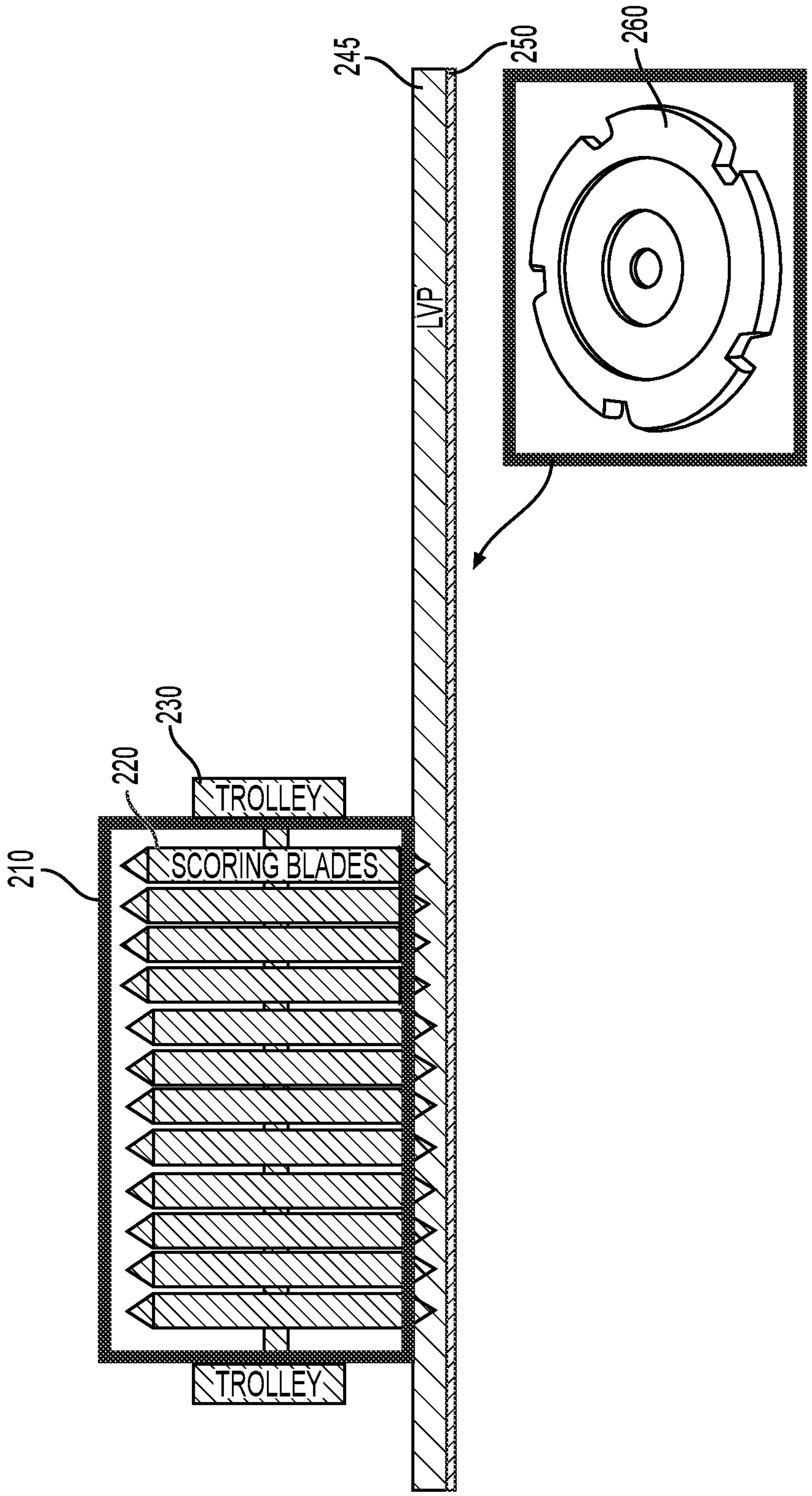
FIG. 2A is a diagram of an example multi-blade router used for scoring LVP.

FIG. 2A is an example illustration of a multiblade router 210 that can be used to score the LVP. The router 210 can house a multiblade assembly 220. The assembly 220 can spin such that each blade rotates. An example blade 260 is a V-scoring saw blade. The assembly 220 can have any number of these blades 260, spaced apart at the desired scoring spacing. In one example, the blades 260 can be approximately 1⁄16 inch apart from one another. The blades can spin on an axis that is horizontal and parallel to the LVP surface. Alternatively, the multiblade assembly 220 can be an assembly of router blades that each spin on a vertical axis 90 degrees (perpendicular) relative to the LVP.

The router 210 can score the rubber backing 245 in which multiple V-shaped grooves are made at various portions of the rubber backing 245 without completely penetrating the rubber backing 245. This can leave the vinyl surface 250 structurally intact. In addition, the router 210 can score the V-shaped grooves within the rubber backing 245 to be 1⁄16 inch apart from one another. In one example, the grooves are approximately the same depth and width. In another example, the grooves towards the center of the scoring section can be either wider or deeper than the outer grooves.

The router 210 can also utilize a trolley system 230 for guiding the router 210 across the LVP in a straight line. The trolley 230 can include rails or guides that are rigid and straight, in an example. The router housing can connect to the rails with wheels, in an example. This can allow smooth and straight operation when sliding the router across the LVP.

Figure 2B:
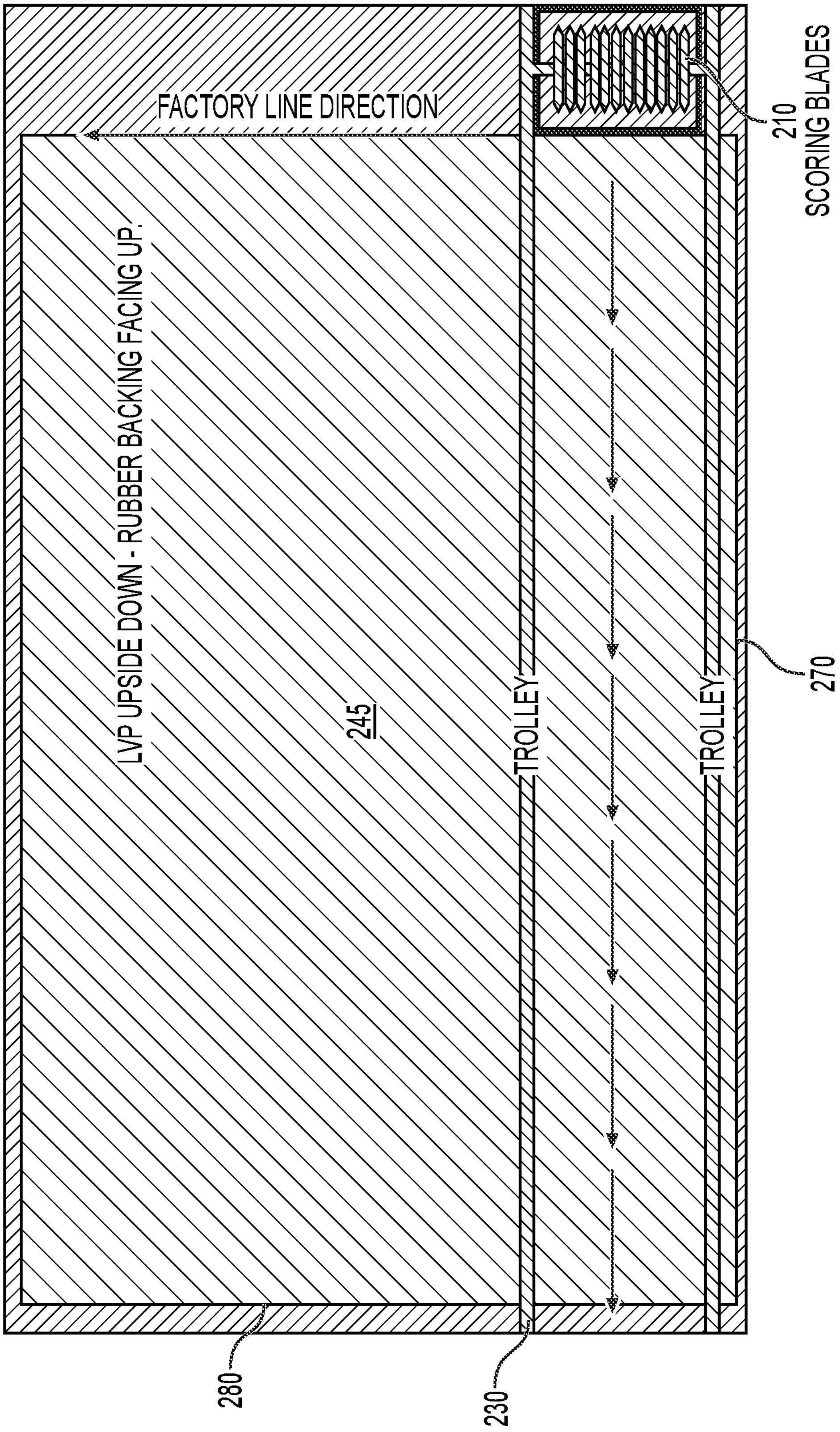
FIG. 2B is a diagram of an example multi-blade router used for scoring LVP.

FIG. 2B is an example illustration of router 210 operation. A piece of LVP is shown upside down, with the backing material 245 face up. The trolley 230 can be setup in a direction perpendicular to one side 280 and parallel to another side 270. The router 210 can be powered, causing the blade assembly to spin. The router 210 can then be pushed down the trolley 270, causing multiple V-shaped grooves to be scored at once.

The scored LVP can then be applied to the stair tread. A stair can have a riser position, tread position, and a nosing position. Further, a distance 320 from a riser position to a tread noising and a riser position to a nosing position on the stair can determined. The riser position and tread and nosing position can each be set positions on each stair among a group of stairs. The riser position can be vertical distance between each stair among the group of stairs. The tread position can be the horizontal distance found on each of the stairs. In one example, the nosing position can be a portion of the stair that protrudes outward from the riser, having a top, bottom, and rounded side. The roundedness of the side (i.e., the nose) can vary between examples.

The LVP can be scored according to measurements of the stair tread and riser, in an example. For example, a thickness of the tread nosing bend can be measured. The thickness can be the distance between the top and bottom of the stair tread. The tread under the nosing can be measured from the bottom of the bend to the riser of the step. This can be done using a measuring tape or the like. A total length of the stair tread, nose, and under the nose can be measured.

Additionally, the width of the stair tread can be measured. For example, a common stair width is 34 inches. The LVP can be cut to size based on the measured length and width as needed.

The installer can select or create a piece of LVP having a scoring region with a width that exceeds the thickness of the tread nosing bend. This can ensure that the LVP is able to conform to the nose of the stair and create the LVP clad stair nosing.

Moreover, the length of the tread nosing bend can be measured to help to determine how the LVP should be cut around the tread nosing bend when the LVP is applied to the stair. The thickness of the tread nosing bend can be the same or similar for each of the steps in the stairway. Accordingly, the LVP can be scored and cut to fit around the bend for each tread nosing bend for each of the stairs, in an example.

The stair riser can be the vertical piece that sits above a first stair tread and below and adjacent second stair tread, slightly recessed from the nose of the second stair tread, and connecting adjacent treads. The stair riser can span a vertical distance from one stair tread to another. The stair nosing can be an outward protrusion at the end of each stair tread. The amount that it protrudes from the below riser can be used to custom cut a piece of LVP to wrap the nose and terminate into the riser. Additionally, a stair tread width from the stair stringer on both ends of the stair can be determined. This can help in determining how wide the LVP needs to be to cover each of the stairs within the staircase.

To prepare LVP for application to a stair tread, a rubber backing 245 of the LVP can be scored. The rubber backing can be scored using a router 210, such as explained with respect to FIGS. 2A and 2B. The router 210 can score the rubber backing without completely penetrating the rubber material, in an example. The router 210 can horizontally score or cut the rubber backing material 245 multiple times to form the scoring section. The scoring section can be applied to the nose of a stair tread to allow for the necessary flex. The scoring can be done at a manufacturing facility or at a job site. Given the stair tread, stair nosing, and stair riser described above, the router can horizontal score, without completely penetrating, the rubber backing material 545 at the various points and cut the rubber backing material 245 to enable the rubber backing material 245 to be able to be placed above and around the various positions of the stair.

The router can include multiple blades to score the rubber backing 245 multiple times, in an example. For example, sixteen blades can be provided for simultaneously scoring sixteen parallel grooves. Different numbers of blades can be used to accommodate different sized scoring sections (e.g., for stairs of differing thicknesses), in an example At a factory-line or jobsite LVP scoring setup, a router 210 can be used to score the LVP. The router 210 can have one or more scoring blades and be pushed along a guide to maintain straight scored V-shaped grooves. Accordingly, each of the scoring blades can score the rubber backing of the LVP.

Figure 3:
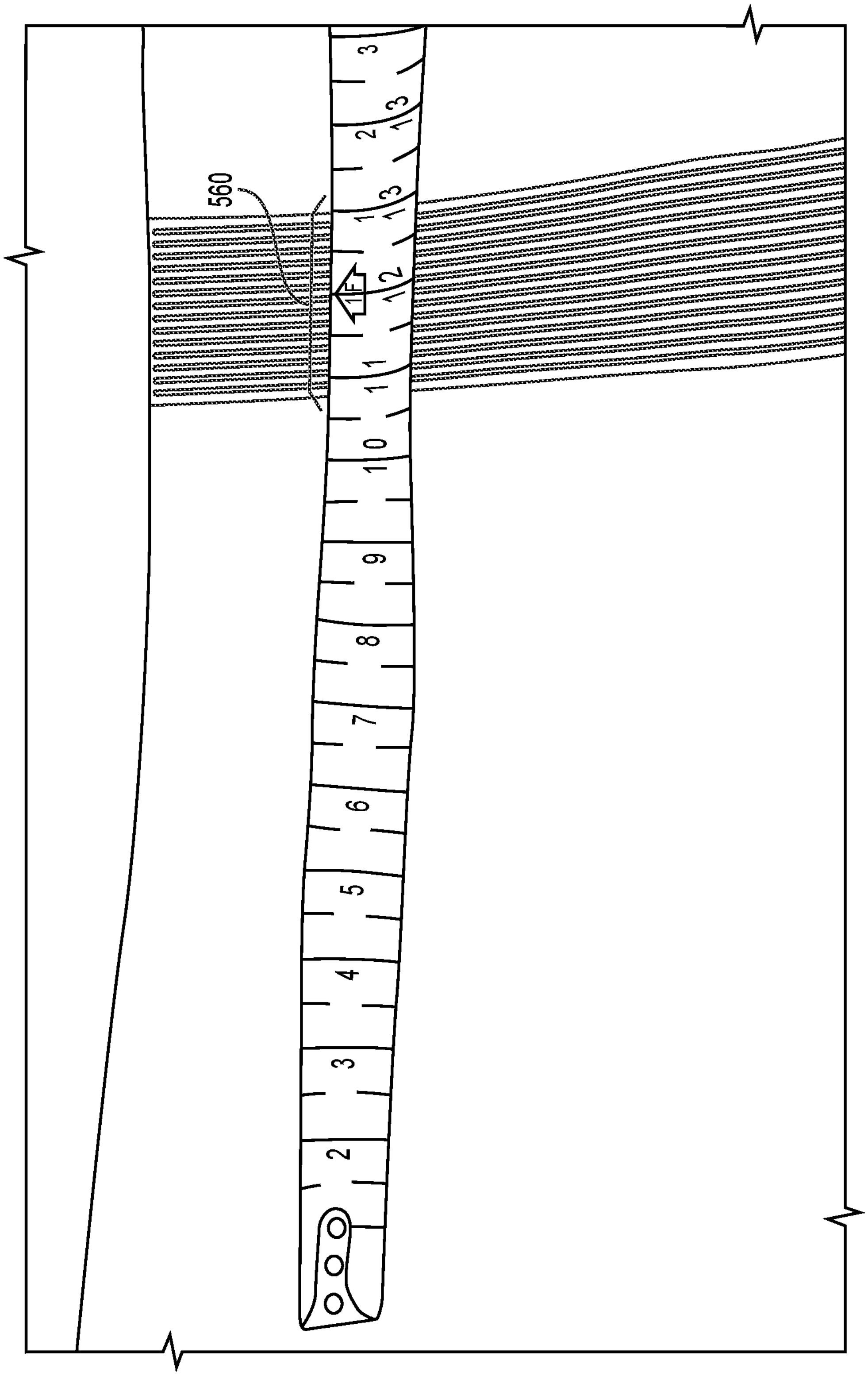
FIG. 3 is an example illustration of scored rubber backing material of the LVP.

FIG. 3 illustrates the rubber backing of a piece of LVP in an upside-down position. A scoring section 560 is illustrated. The scoring section 560 can include any number of parallel scored V-shaped grooves, depending on the desired bend width for wrapping around a stair nose using the LVP. In one example, the scoring section is less than three inches wide. In one example, the width of the scoring section is an inch and a quarter. FIG. 3 includes a close-up illustration of an example scoring section 560 having a width. In this example, the width is roughly 2.25 inches thick. This can allow the rubber backing to fit around the bend of the stair nosing to form the stair nose. The scoring section can be spaced from the end of the piece of LVP to allow the LVP to be wrapped under the stair tread and terminate into the below riser.

The scoring section 560 can be created by running a router horizontally over the rubber backing. The router can score the rubber backing to conform the LVP around the stair nosing position.

In one example, a top side of the LVP material can also be cut to enable the LVP to fit on each of the stairs. For example, a utility knife or a straight edge can be used to cut the top side to create one or more openings within the top side. This can be done to cut the LVP into a smaller piece, in an example.

To cut or score the LVP, a guide can be used. The guide can traced with a blade for cutting the top side of the LVP. The top side can be cut to obtain the necessary shape for the LVP to conform to the measurements of the stairs at the various positions described above.

In one example, a separate riser piece can also be cut so that the stairs can also have a uniform riser.

Once the LVP has been scored and cut with the techniques described above, the LVP can then be secured to the stairs. The LVP can be secured to the stairs by glue. Alternatively, factory-applied adhesive can be applied to the LVP material after the LVP has been prepared and scored. In addition, the LVP can also be held securely onto the stairs by a plurality of permanent staples and temporary clamps.

Any type of glue for securing LVP can be used to secure the LVP to the stairs. In one example, a 9 inch by ⅛ inch by $\frac{1}{16}$ inch flat top v-notched flooring trowel can be used to apply the glue onto the stairs before the LVP is applied.

In one example, glue can be applied to the stair treads and risers, including stair nosing positions. The glue application can help to ensure that the LVP material is secure onto the stairs. The LVP can then be applied to the stairs. In other embodiments, permanent staples and temporary clamps can be used to further secure the LVP material onto the stairs.

In one example, after glue has been applied, the LVP can be placed on top of the stair with the scoring section towards the nose of the stair. Then the LVP can be bent around the nose, with the scoring section providing the needed flex that is not normally available on LVP. When the LVP material has been applied to the stairs, the LVP can be secured onto the stairs using permanent staples and temporary clamps. Alternatively, factory-applied adhesive can be applied to the LVP material after the LVP has been prepared/scored.

To securely hold the LVP in place onto the stairs, staples can be applied in addition to the glue application. One or more staples can be applied to the LVP to hold the LVP securely in place onto the stairs beneath the stair nosing position. Then, decorative trim can be applied to the riser or underside of the stair nosing to hide the staples.

Figure 4:
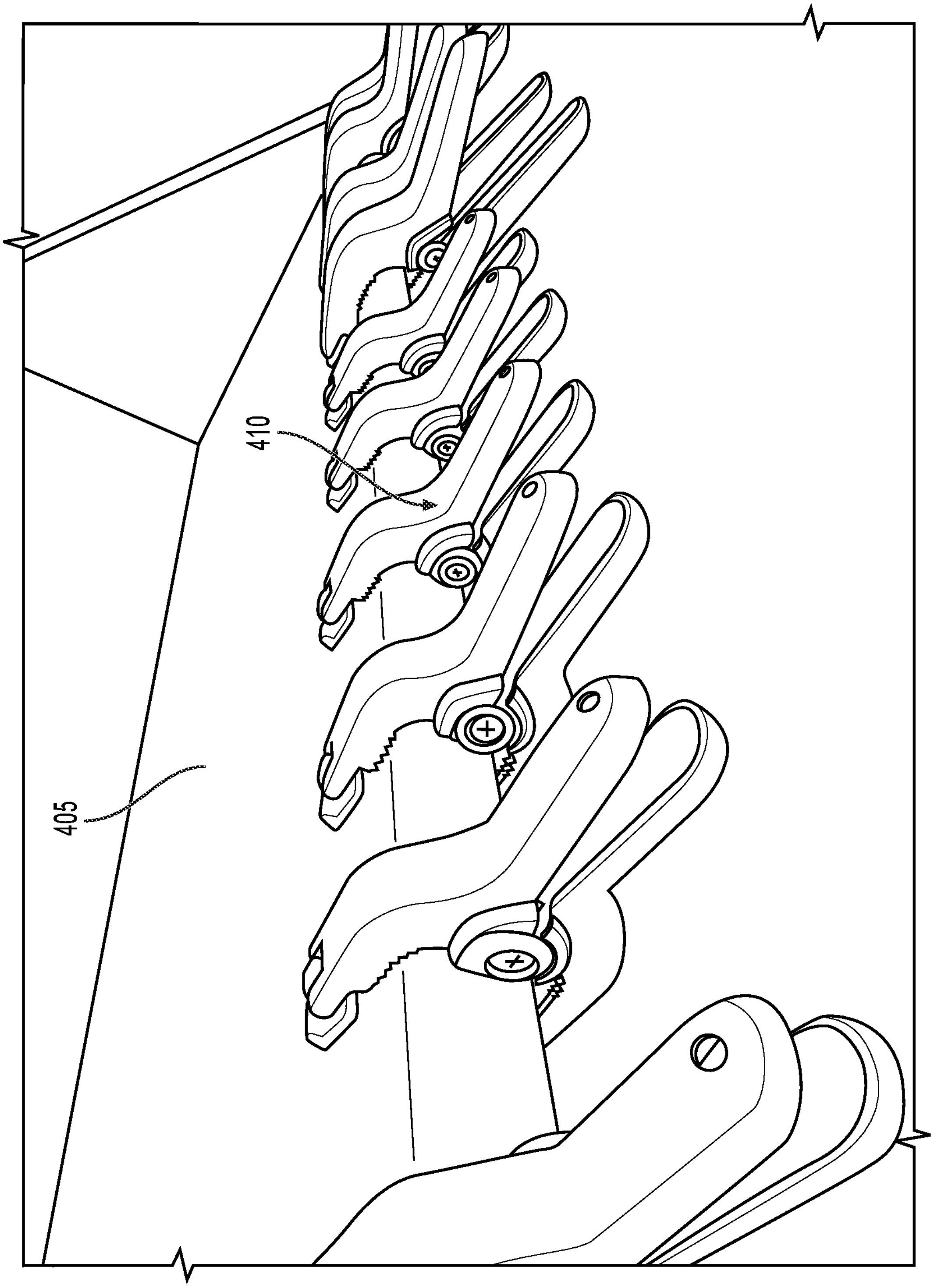
FIG. 4 is an example illustration of providing clamps to the stair nosing position for the stairs.

FIG. 4 is an example illustration of one way to install the LVP on a stair tread. In this example, multiple clamps 410 can be used to hold the LVP to the stair 405 while a glue application cures. The clamps 410 can remain in place as long as required until the glue application has cured. The clamps 410 can hold the LVP to the top and bottom of the stair 405, such that the nose is wrapped with the LVP.

In one example, the user can clamp the LVP to the stair 405 as shown, and then apply staples to the underside of the stair 405, through the LVP. The user can then unclamp the LVP and apply a decorative trim beneath the stair 405 along the riser to hold the LVP in place while also hiding the staples.

Figure 5A:
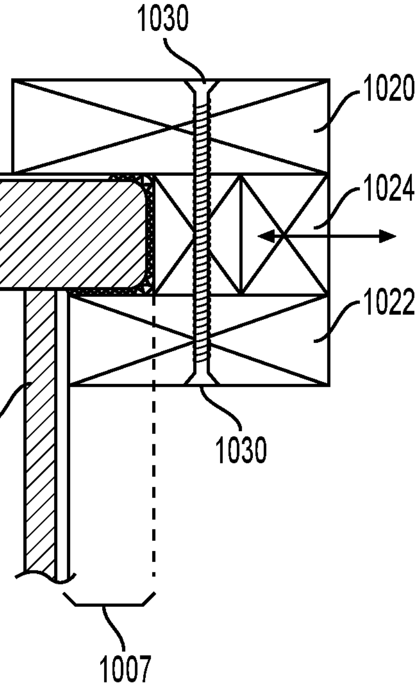
FIG. 5A is an example illustration of a stair tread with LVP applied around the stair nose.
Figure 5B:
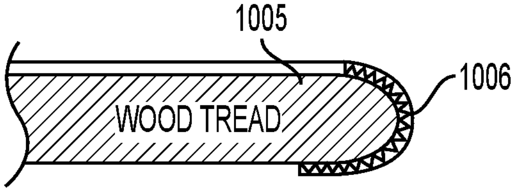
FIG. 5B is an example illustration of a stair tread with LVP applied around the stair nose.
Figure 5C:
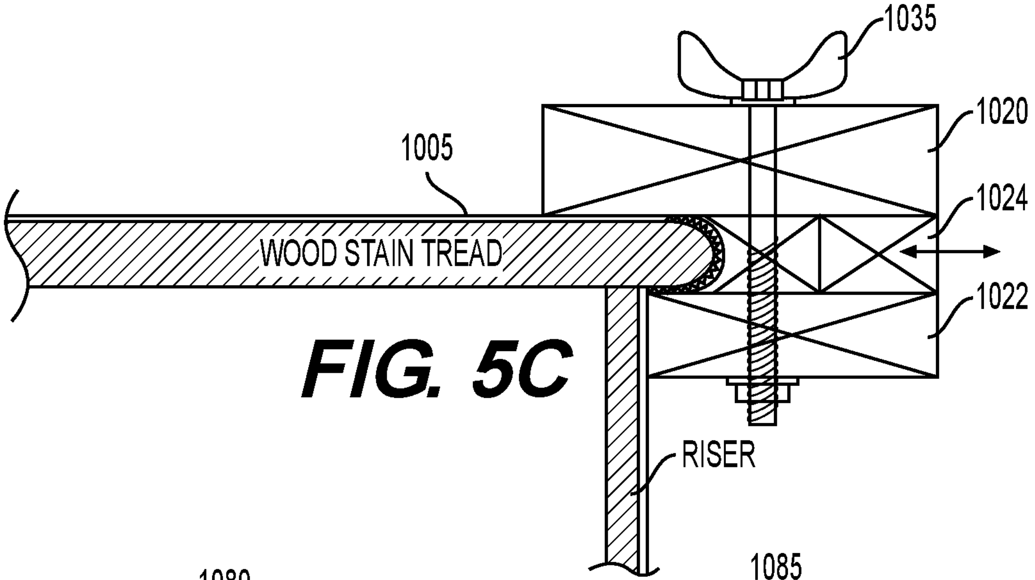
FIG. 5C is an example illustration of a stair tread with LVP applied around the stair nose.

FIGS. 5A, 5B, and 5C are example illustrations showing cross sectional views of a stair tread 1005 having LVP installed around a nose of the tread 1005. In FIG. 5A, the LVP is installed by using a single clamp with multiple clamp members 1020, 1022, 1024 to hold the LVP to the stair tread 1005 while a glue application cures. The clamp members 1020, 1022, 1024 can be boards in one application. However, the clamp members 1020, 1022, 1024 can be made of steel or other materials in another example. As shown in FIG. 5A, the clamp can include a first clamp member 1020 on top of the stair tread 1005, second clamp member 1022 below the stair tread 1005, and a screw 1030 for tightening the clamp members 1020, 1022 together. Screw 1030 can instead be a wing nut and bolt, such as the bolt 1035 of FIG. 5C, or some other tightening mechanism. Additionally, a third clamp member 1024 roughly the same thickness as the stair tread 1005 can be used to balance both sides of the clamp and prevent the clamp members 1020, 1022 from pinching away from the nose. In one example, the third clamp member 1024 can actually be a piece of stair tread having the same thickness as the tread 1005, to prevent pinching. The bottom clamp member 1022 can be wide enough to fit against the riser and span the distance 1007 beneath the stair tread 1005.

FIG. 5B shows the stair tread 1005 with the LVP wrapped around the nose. The portion 1006 of LVP that wraps around the nose can be pre-scored prior to application, allowing for the needed bend. In one example, a piece of trim can be installed beneath the stair tread 1005, butted up against both the riser and the LVP on the underside of the stair tread 1005. This can help hold the portion 1006 of LVP firmly against the nose of the stair tread 1005, in an example.

FIG. 5C illustrates an example for installing the LVP using a similar clamp to that of FIG. 5A. However, in FIG. 5C, instead of using two screws 1030 like in FIG. 5A, a nut and bolt combination 1035 can be used for tightening the clamp.

As mentioned regarding FIG. 5B, a decorative piece of trim can be installed in place of clamp member 1022 in an example. The decorative trim can be permanently installed to provide hold support after the clamp member 1022 is removed. In one example, the clamp member 1022 can actually be the decorative trim. For example, the trim can cover up staples on the underside of the stair tread 1005 and can be stapled, screwed or nailed into the underside of the tread 1005 or into the riser. Even in an example where staples are not used, the trim can hold the LVP on the underside of the stair tread 1005. The trim can be dimensioned such that it does not exceed the depth of the stair tread 1005 relative to the riser.

Figure 5D:
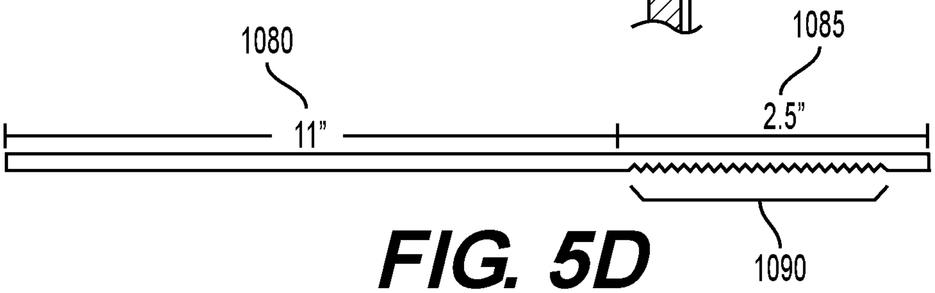
FIG. 5D is an example illustration of a stair tread with LVP applied around the stair nose.

FIG. 5D is a cross sectional view of an example piece of LVP, such that could be wrapped around the tread 1005 of FIGS. 5A-5C, with the end result being a covered stair tread, as shown in FIG. 5B. The dimensions of the LVP secured on the stairs can be 3-foot-wide planks. The depth can be dictated by the length between risers. In the example of FIG. 5D, the depth calls for an 11 inch step 1080 with a 2.5 inch section 1085 for bending around the nose. The scored section 1090 can be less than or equal to section 1085 in an example. Other dimensions are possible, such as 48-inch wide planks with larger depth. The dimensions of the LVP can be adjusted according to the measurements above for the stair riser, stair tread, and stair nosing positions.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A luxury vinyl floorcovering that can be used on flat surfaces or stair treads, comprising:

a rectangular decorative layer for foot traffic; and a rectangular backing layer comprising a bottommost layer, wherein the backing layer is adhered to the decorative layer, the backing layer including a scoring section of parallel grooves that run parallel to a width of the backing layer and the luxury vinyl floorcovering, wherein the scoring section flexes for bending the decorative and backing layers around a rounded stair nose on a jobsite, wherein the parallel grooves do not fully penetrate the bottommost layer; and wherein the parallel grooves are approximately $\frac{1}{16}$ inches apart and approximately $\frac{1}{16}$ inches deep.

2. The luxury vinyl floorcovering of claim 1, wherein the scoring section is closer to a first side of the luxury vinyl floorcovering than to a second side and is created at a jobsite by cutting the parallel grooves into the backing layer.

3. The luxury vinyl floorcovering of claim 1, wherein the luxury vinyl floorcovering is flat prior to bending around a stair nose.

4. The luxury vinyl floorcovering of claim 1, wherein the parallel grooves have the depth and width.

5. The luxury vinyl floorcovering of claim 1, wherein the parallel grooves do not fully penetrate the backing layer.

6. The luxury vinyl floorcovering of claim 1, wherein the backing layer is polyvinyl chloride ("PVC").

7. The luxury vinyl floorcovering of claim 1, wherein the luxury vinyl floorcovering is attached to a stair that includes the rounded stair nose by directly applying glue to the stair.

8. The luxury vinyl floorcovering of claim 1, wherein the scoring section is less than three inches deep when measuring across the parallel grooves.

9. The luxury vinyl floorcovering of claim 1, further comprising an adhesive for attaching the backing layer to a stair at a jobsite.

10. The luxury vinyl floorcovering of claim 1, further comprising an installation clamp with an opening that has a thickness selected to match a thickness of a stair tread to which the LVP is being attached.

11. The luxury vinyl floorcovering of claim 1, wherein the scoring section is closer relative to one side of the luxury vinyl floorcovering than to an opposite side, and has a size and location based on measurements of the stair tread.

12. The luxury vinyl floorcovering of claim 1, wherein the scoring section is closer relative to one side of the luxury vinyl floorcovering than to an opposite side, and is created with a scoring tool with multiple parallel blades that make at least some of the parallel grooves in a single pass across the backing layer.

13. The luxury vinyl floorcovering of claim 1, wherein the scoring section is closer relative to one side of the luxury vinyl floorcovering than to an opposite side, and is created using a guide on the backing layer, wherein a scoring instrument is run parallel to the guide.

14. A system for installing luxury vinyl floorcovering, comprising:

a router with multiple parallel blades; and a luxury vinyl floorcovering that includes:

a rectangular decorative layer for foot traffic; and a rectangular backing layer with a bottommost layer, the backing layer being adhered to the decorative layer, wherein the router creates a scoring section on the backing layer, the scoring section including parallel grooves that run parallel to a width of the backing layer, wherein the scoring section flexes for bending the decorative and backing layers around a rounded stair nose at a jobsite, wherein the parallel grooves do not fully penetrate the bottommost layer; and wherein the parallel grooves are approximately $\frac{1}{16}$ inches apart and approximately $\frac{1}{16}$ inches deep.

15. The luxury vinyl floorcovering system of claim 14, wherein the parallel grooves are approximately $\frac{1}{16}$ inches apart and approximately $\frac{1}{16}$ inches deep.

16. The luxury vinyl floorcovering system of claim 14, wherein the scoring section is created at the jobsite by cutting the parallel grooves into the backing layer.

17. The luxury vinyl floorcovering system of claim 14, wherein the LVP plank is flat prior to bending around a stair nose.

18. The luxury vinyl floorcovering system of claim 14, wherein the router adjusts blade height according to backing layer thickness such that the parallel grooves do not fully penetrate the backing layer.

19. A method for covering one or more stairs with luxury vinyl floorcovering, comprising:

scoring a backing material of a piece of luxury vinyl floorcovering to create parallel scored grooves that partially penetrate the backing material and form a scoring section wherein the parallel scored grooves are oriented perpendicularly to a first side of the piece;

placing the piece of luxury vinyl floorcovering onto a stair tread, wherein the scoring section is wrapped around a nose of the stair tread; and securing the piece of luxury vinyl floorcovering on a top and a bottom of the stair tread with at least one of glue, staples, and a piece of trim, wherein the scoring is performed by using a scoring device that comprises:

a housing;

a trolley that guides the housing in a straight line;

a blade assembly at least partially within the housing that includes multiple blades positioned on an axle; and a motor to rotate the axle while the scoring device travels down the trolley.

* * * * *